(12) United States Patent
Levi

(10) Patent No.: US 9,481,313 B2
(45) Date of Patent: Nov. 1, 2016

(54) ERGONOMIC LADDER RACK FOR WORK VANS

(71) Applicant: SAFE FLEET ACQUISITION CORP., Belton, MO (US)

(72) Inventor: Avraham Y. Levi, Eagan, MN (US)

(73) Assignee: Safe Fleet Acquisition Corporation, Belton, MO (US)

( * ) Notice: Subject to any disclaimer, the term of this patent is extended or adjusted under 35 U.S.C. 154(b) by 0 days.

(21) Appl. No.: 14/542,788

(22) Filed: Nov. 17, 2014

(65) Prior Publication Data

US 2016/0137139 A1    May 19, 2016

(51) Int. Cl.
*B60R 9/04* (2006.01)
*B60R 9/048* (2006.01)

(52) U.S. Cl.
CPC .................. *B60R 9/0485* (2013.01)

(58) Field of Classification Search
CPC .......................... B60R 9/0485; B60R 9/0423
USPC ......................................................... 224/310
See application file for complete search history.

(56) References Cited

U.S. PATENT DOCUMENTS

| | | | |
|---|---|---|---|
| 3,722,766 A | 3/1973 | Barrineau et al. | |
| 3,904,094 A * | 9/1975 | Correll | B60R 9/0485 224/324 |
| 4,170,331 A | 10/1979 | Faulstich | |
| 4,618,083 A | 10/1986 | Weger, Jr. | |
| 5,297,912 A | 3/1994 | Levi | |
| 5,848,743 A | 12/1998 | Derecktor | |
| 6,092,972 A | 7/2000 | Levi | |
| 6,427,889 B1 | 8/2002 | Levi | |
| 6,764,268 B2 | 7/2004 | Levi | |
| 6,971,563 B2 | 12/2005 | Levi | |
| 7,097,409 B2 | 8/2006 | Richter | |
| 2011/0214944 A1 | 9/2011 | Levi | |
| 2014/0030054 A1 | 1/2014 | Levi | |

* cited by examiner

*Primary Examiner* — Corey Skurdal
(74) *Attorney, Agent, or Firm* — Nikolai & Mersereau, P.A.; Thomas J. Nikolai

(57) ABSTRACT

An ergonomically improved vehicle ladder rack has the top of its side rail(s) flush with the top surface of the rear cross-bar so that a foot portion of a ladder being transported may be made to slide off from the rack without a need for lifting it. To prevent lateral shifting of the ladder during transport on the vehicle, an abutment finger is added to the rotatable rung clamping assembly. The abutment finger blocks lateral shifting of a ladder when the rung hook is engaging a ladder rung and is non-blocking when the rung is disengaged.

6 Claims, 4 Drawing Sheets

ERGONOMIC LADDER RACK FOR WORK VANS

CROSS REFERENCE TO RELATED APPLICATIONS

None

STATEMENT OF GOVERNMENT SPONSORSHIP

None

BACKGROUND OF THE INVENTION

I. Field of the Invention

This invention relates generally to roof or ladder racks mountable on the roof of motor vehicles for transporting one or more extension ladders and/or step ladders to a work site, and more particularly to the ergonomic construction that alleviates the need for a worker to lift the ladder vertically when removing a ladder from the roof rack upon reaching a work site.

II. Discussion of the Prior Art

Work vehicles, such as commercial vans, often incorporate a roof rack adapted to support cargo of one type or another to be used at a work site. Such cargo often includes extension ladders and/or step ladders. To avoid loss of the cargo during transport and possible serious injuries to other motorists who may be traveling behind the work vehicle, various means have been devised for securing cargo and especially ladders, to the ladder rack. For example, some have used bungee cords and ropes to tie ladders in place on the vehicle-mounted roof rack, but this is generally a considerable effort, especially given the height and placement of the ladder rack on the van roof. In applicant's printed application US 2011/0214944 A1, which is hereby incorporated by reference herein, there is described a ladder rack and especially an improved clamping structure for releasably securing ladders to a roof mounted ladder rack. It comprises a pair of side rails 12 and 14 that are held in parallel spaced-apart relation by front and rear cross-bars 16 and 18. In that design, the side rails 12 and 14 are mounted so as to be upwardly offset from the top surface of the cross-bars 16 and 18.

A clamp member 60 is affixed to a shaft 42 that is journaled for rotation about an axis parallel to the rear cross-bar 18. The clamp member in the form of an L-shaped hook can be raised and lowered by manipulating a crank 82. When the clamp member 60 is in its raised position, such as shown in FIG. 1 of the aforereferenced published application, it is made to engage a ladder rung capturing the ladder between a fixed, front clamp member 22 and the rotatable clamp member 60. Because the side rails 12 and 14 are elevated with respect to the ladder-supporting cross-bars 16 and 18, a worker, standing on the ground, must reach up and lift the foot portion of the ladder over the adjacent side rail which has proven to be an arduous task for some workers, especially persons of smaller stature. The present invention obviates this problem by requiring less effort in order to transfer a ladder from its transport position atop the cross bars of the roof rack on the vehicle to a removed position. In the removed position the foot of the ladder is brought down to rest on the ground while the upper portion of the ladder remains in contact with the side rail 12 or 14 and its horn 37 or 39.

While, after-the-fact, the present invention may appear simple, it solves a practical problem of allowing a worker to more readily remove or replace ladders from and onto a van mounted roof rack without strain.

SUMMARY OF THE INVENTION

In accordance with the present invention there is provided a pair of side rails that are held in parallel, spaced-apart relation by front and rear cross-bars. In the present invention, however, rather than having the side rails at a higher elevation than the front and rear cross-bars, the top surface of the cross-bars are made even or flush with the top surface of the side rails so that a ladder can readily be slid off the roof rack without a need to elevate the ladder to clear the side rail.

To prevent lateral shifting of a ladder during transport, there is added to the shaft of the rotatable clamping member an abutment finger that also rotates with the clamping members shaft so as to block lateral movement of a ladder when the clamping member is engaging a ladder rung but which moves to a non-obstructing position when the ladder clamping member is moved to its release position.

DESCRIPTION OF THE DRAWINGS

The foregoing features, objects and advantages of the invention will become apparent to those skilled in the art from the following detailed description of a preferred embodiment, especially when considered in conjunction of the accompanying drawings in which like numerals in the several views refer to corresponding parts.

DESCRIPTION OF THE PREFERRED EMBODIMENT

Figure 1:
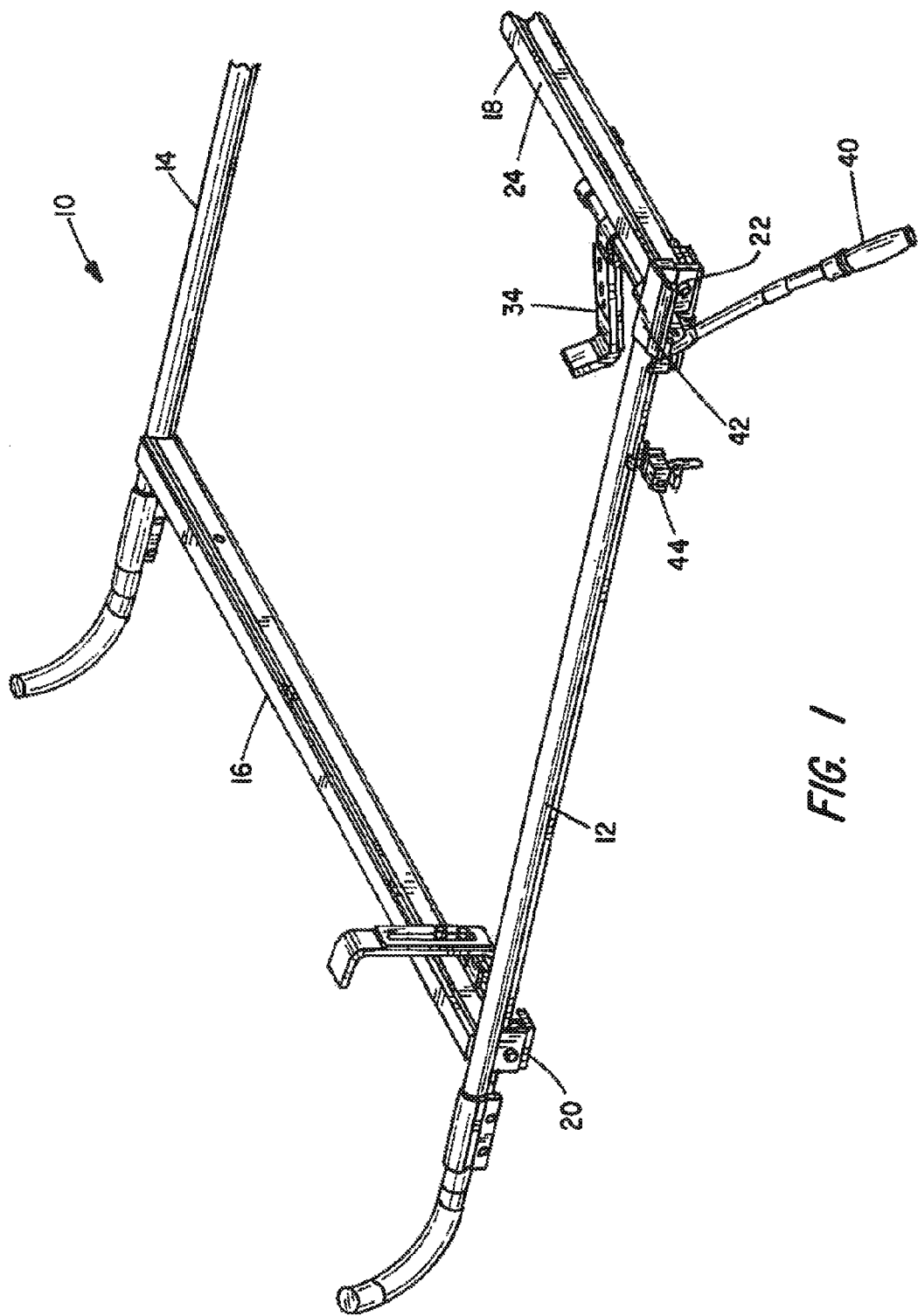
FIG. 1 is a partial perspective view of the preferred embodiment of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, a vehicle roof rack constructed in accordance with the present invention is indicated generally by numeral 10. It is seen to comprise at least one, and preferably two, tubular side rails, as at 12 and 14, of extruded aluminum that are held in parallel, spaced-apart relationship to one another by a front cross-bar 16 and a rear cross-bar 18. Brackets, as at 20 and 22, are attached to T-shaped clamping ridges (not shown) formed on the undersurface of the side rails 12 and 14. The cross-bars 16 and 18 connect to the brackets 20 and 22 such that the top-surface 24 of the cross-bar 18 is even or flush with the arcuate top surface of the side rails 12 and 14.

As in applicant's earlier invention of the afore-referenced published application 2011/0214944 A1, affixed to the rear cross-bar 18 is a rear rising clamp assembly indicated generally by numeral 26. First and second bearing brackets 28 and 30 are used to journal a cylindrical rod 32 for rotation. The bearing brackets 28 and 30 are shown clamped to the rear cross-bar 18 such that the shaft 32 is rotatable about an axis that extends parallel to the rear cross bar 18.

Figure 2:
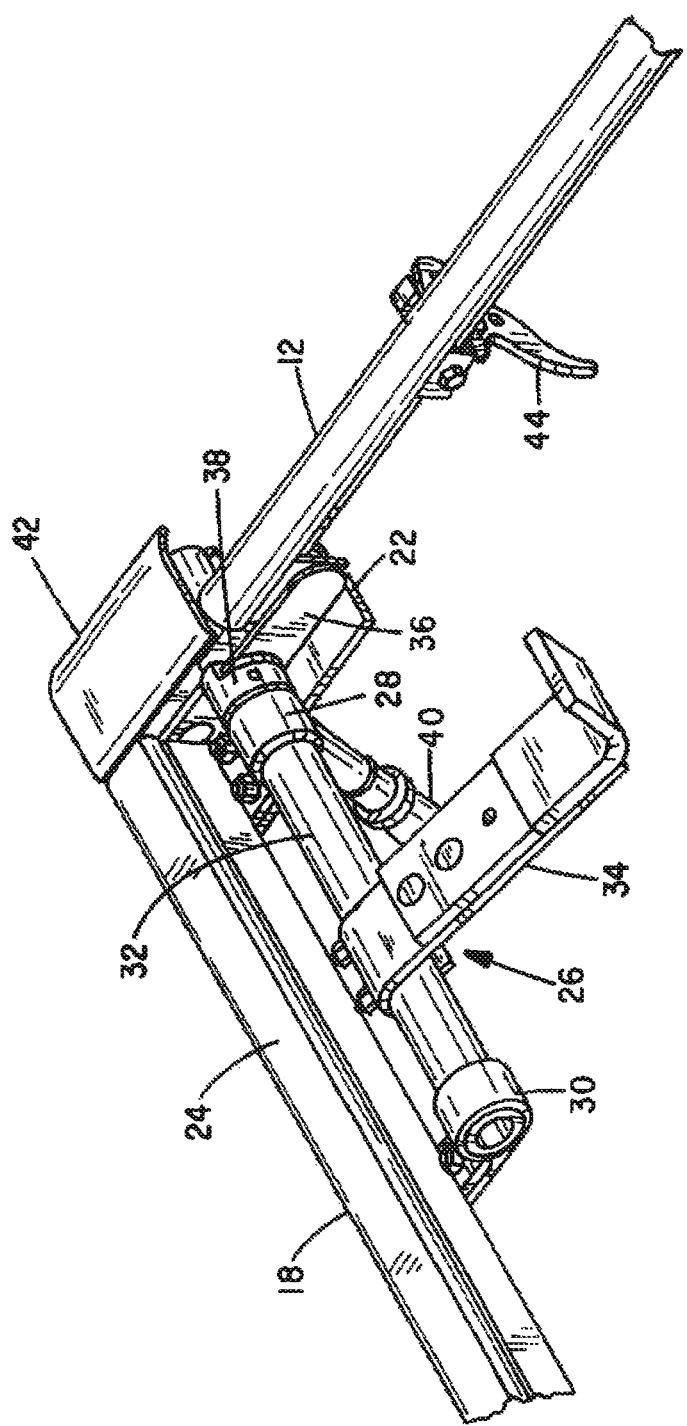
FIG. 2 is a detailed, close-up view showing the rotatable clamping structure and the junction between the rear cross-bar and a rear-end of a side rail when the clamping member is in its non-rung engaging position.
Figure 3:
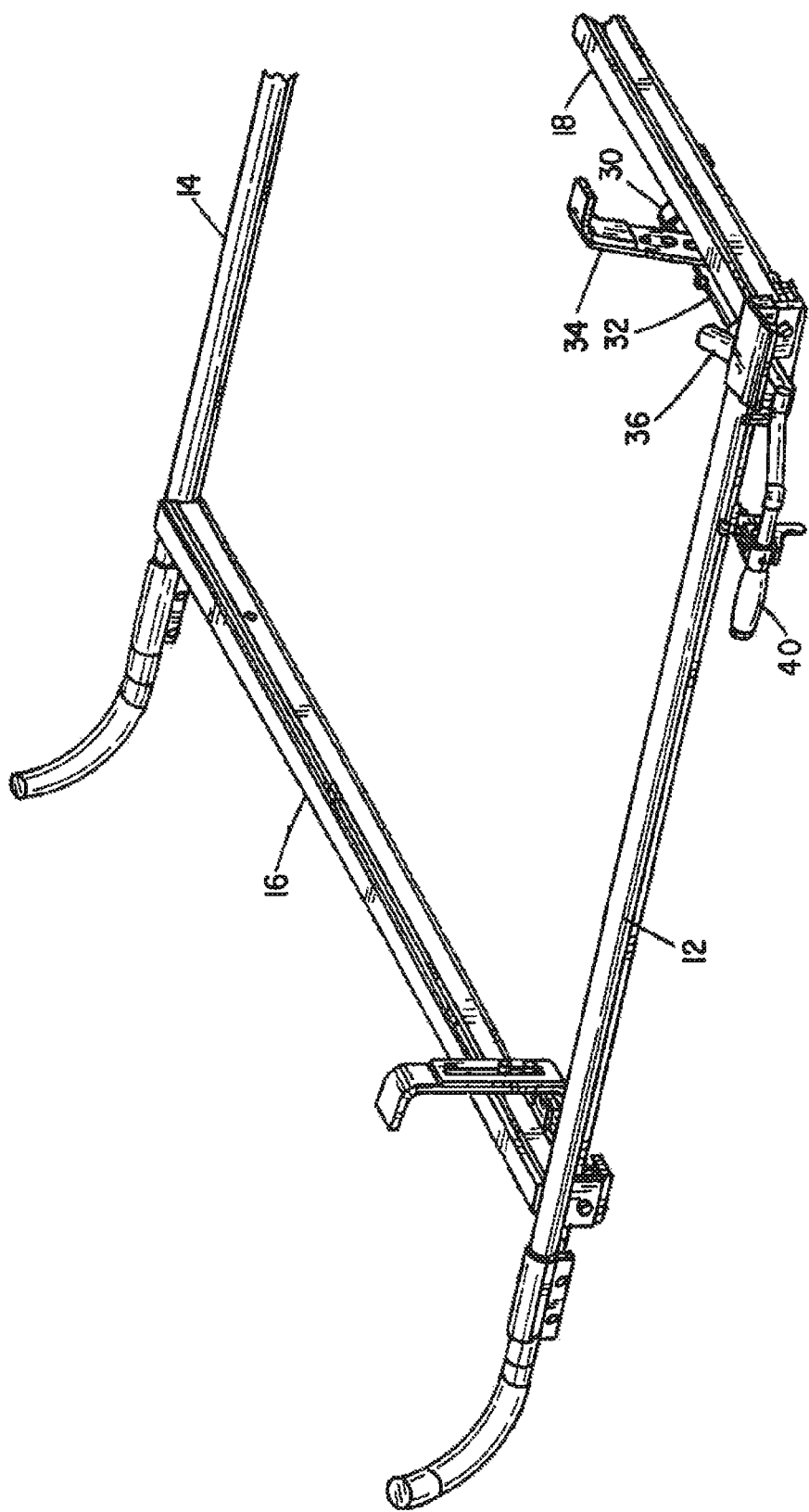
FIG. 3 is a view like that of FIG. 1 but with the ladder rung engaging clamp member in its elevated position.
Figure 4:
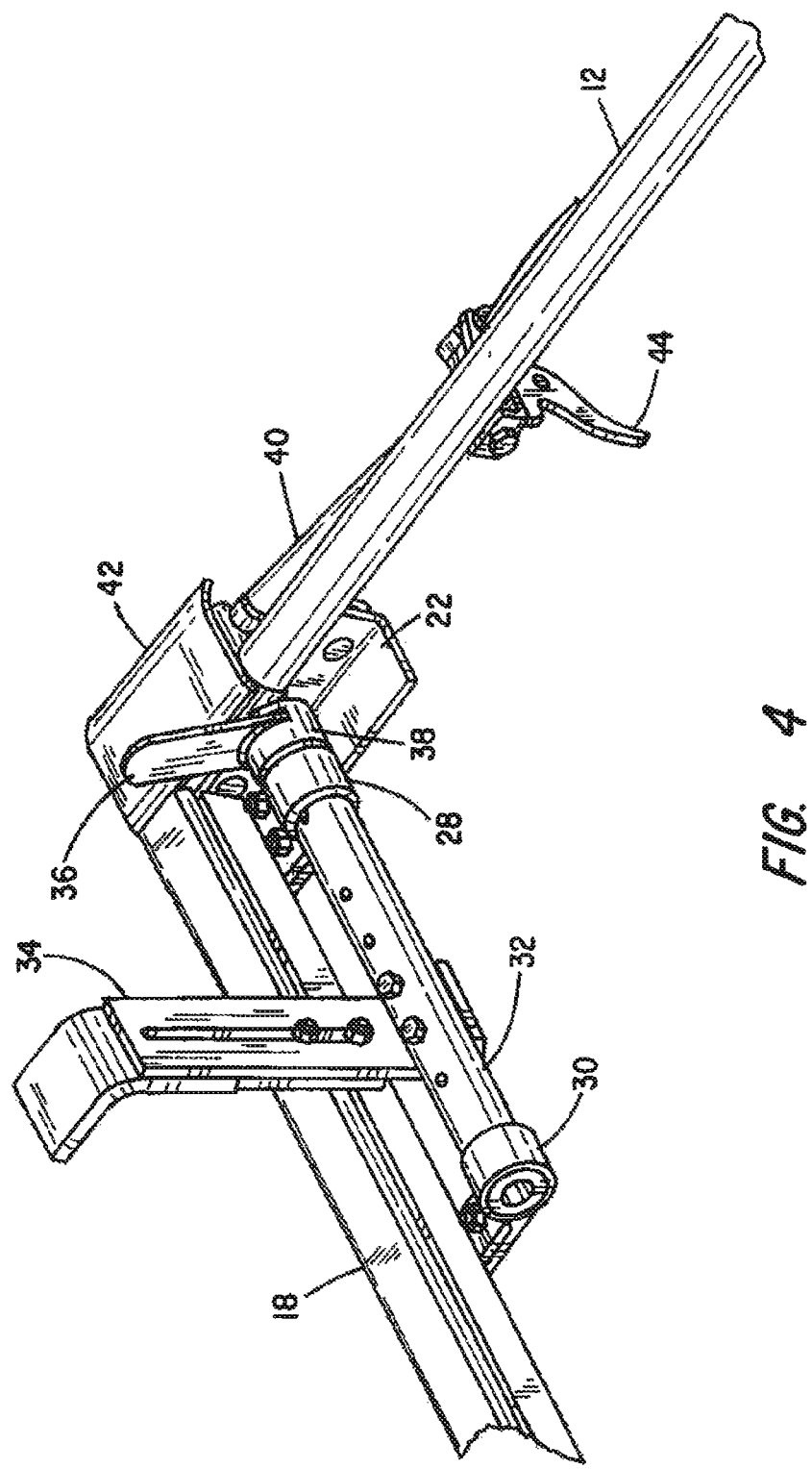
FIG. 4 is a view like that of FIG. 2 but with the clamping member in its elevated, rung-engaging disposition.

Affixed to the shaft 32 is a clamp member in the form of an L-shaped hook 34 that is adapted to engage a rung of a ladder when rotated to a generally vertical position as shown in FIGS. 3 and 4. When the clamp 34 is in its lower disposition as shown in FIGS. 1 and 2, it does not engage a ladder rung, allowing the foot of the ladder to be shifted laterally along the top surface 24 of the rear cross-bar and to pass over the junction between the rear cross-bar member 18 and the side rail 12 without the need to lift the ladder as was the case with the embodiment described in the afore-referenced published application 2011/0214944.

To prevent lateral shifting of a ladder during transport when the rotatable clamp 26 has the hook 34 in its raised disposition, there is provided an abutment finger 36 that is affixed to the shaft 32 by a ring 38 that is riveted or otherwise affixed to the shaft 32. As can be seen in FIGS. 3 and 4, when the hook 34 is in its raised disposition so as to engage the rung of a ladder, the abutment finger 36 is also elevated so as to engage a ladders side rail to prevent lateral shifting of the ladder. However, when the clamping assembly is in its lowered disposition, out of engagement with a ladder rung, the abutment finger 36 is recessed with respect to the upper surfaces of the side rail 12 and the cross-bar 18 thereby allowing a worker to slide the ladder's foot portion from the rear cross-bar 18 without needing to lift it.

As in applicant's earlier invention of the '494 application, a crank arm 40 is provided to facilitate rotation of the shaft 32. It has been found convenient to install a generally flat shield plate 42 that extends over the rear-end of the side rail 12 so as to be in covering relation with respect to the joint or connection between the handle 40 and its coupling to the end of the shaft 32. A spring latch 44 is affixed to the side rail 12 to capture the crank arm 40 when the rung clamping hook 34 is in its elevated disposition, such as when ladders on the roof rack are being transported to a work location.

When a worker arrives at a work site and wishes to remove an extension ladder from the vehicle's roof rack, he or she will depress the trigger on the spring latch 44 to open its jaws and release the crank arm 40, By rotating the crank arm counterclockwise as viewed in FIG. 1, the clamp hook 34 will be moved from its vertical disposition, such as in FIG. 4, to the more horizontal disposition shown in FIG. 1. At the same time, the abutment finger 36 also rotates to a lowered disposition so that it does not interfere with the ability to slide the foot of the ladder so that its previously innermost ladder side rail no longer rests on the rear cross-bar's top surface 24. The worker then lowers the ladder's foot onto the ground, keeping the upper portion of the ladder still engaged by the horn affixed to the front end of the side rail 12. When the ladder is so positioned, the worker can readily move to the ladder's balance point and lift the upper end of the ladder free of the curved horn and walk with the ladder to its point of use. In that the upper surface 24 of the rear cross-bar 18 is flush with the upper surface of the side rail 12, the worker is not required to lift or elevate the ladder, but only need slide the ladder off from the rear cross-bar's top surface 24.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A roof top ladder rack for work vehicles comprising:
    a) at least one side rail coupled to front and rear cross bars, the rear cross bar having an upper ladder support surface at an elevation flush with a top level of the at least one side rail;
    b) a rotatable, L-shaped clamp member adapted to engage a ladder rung and affixed to a shaft that is journaled for rotation about an axis that is parallel to the rear cross bar between a raised rung engaging position and a lowered rung released position; and
    c) a planar abutment finger affixed to the shaft at a location directly adjacent the at least one side rail and rotatable with the shaft, the arrangement being such that a ladder being carried on the rack may be slid from the rear cross bar over the at least one side rail without a need to lift the ladder when the rotatable clamp member is in the lowered rung released position and the ladder being carried is blocked from sliding laterally beyond the at least one side rail by the abutment finger when the rotatable L-shaped ladder clamp member is in the raised, rung engaging position.

2. The roof-top ladder rods of claim 1 and further including a stationary clamp adapted to engage a ladder rung affixed to and projecting upwardly from the front cross-bar member.

3. The roof-top ladder rack of claim 1 and further including a crank affixed to the shaft for imparting rotation thereto.

4. The roof-top ladder rack of claim 3 and further including a shield member affixed to said at least one side rail in covering relation to a connection of the crank to the shaft.

5. The roof-top ladder rack of claim 1 wherein the shaft is journaled for rotation by bearings affixed to the rear cross bar.

6. The roof-top ladder rack of claim 1 and further including a second side rail held in parallel, spaced-apart relation to said one side rail by the front and rear cross bars.

* * * * *